United States Patent [19]
Kariya

[11] Patent Number: 5,718,309
[45] Date of Patent: Feb. 17, 1998

[54] ROTARY DAMPER WITH GROOVES AND WALL SPACES

[75] Inventor: Yoshitaka Kariya, Yokohama, Japan

[73] Assignee: Nifco Inc., Yokohama, Japan

[21] Appl. No.: 651,673

[22] Filed: May 21, 1996

[30] Foreign Application Priority Data

Sep. 1, 1995 [JP] Japan .................... 7-246988

[51] Int. Cl.⁶ ........................................ F16F 9/12
[52] U.S. Cl. ........................ 188/290; 188/322.5
[58] Field of Search ...................... 188/290, 296, 188/322.5; 192/112, 58.4

[56] References Cited

U.S. PATENT DOCUMENTS 4,513,473  4/1985  Omata .................. 188/290 X
4,527,675  7/1985  Omata et al. ............ 188/290

*Primary Examiner*—Josie Ballato
*Attorney, Agent, or Firm*—Kanesaka & Takeuchi

[57] ABSTRACT

A rotary damper is formed of a first member including a driven gear on one side, and one of a supporting shaft and an inner cylindrical projection to form a circular fitting dent therein on a side opposite to the one side; and a second member including the other of the supporting shaft and the inner cylindrical projection on one side thereof. The supporting shaft is inserted into the fitting dent of the inner cylindrical projection to connect the first and second members together. At least one of the supporting shaft and the inner cylindrical projection may have grooves on circumferential surfaces facing each other to fill viscous fluid therein. An outer cylindrical projection situated outside the inner cylindrical projection or an inner cylindrical partition wall situated outside the supporting shaft may have discontinuous portions to fill the viscous fluid therein. Thus, the viscous fluid is fully and uniformly filled in the spaces to thereby obtain a desired damper effect for a long time.

8 Claims, 3 Drawing Sheets

ROTARY DAMPER WITH GROOVES AND WALL SPACES

BACKGROUND OF THE INVENTION AND RELATED ART STATEMENT

The present invention relates to a rotary damper, wherein rotation of a driven gear to be engaged with a rack and gear is braked by viscous resistance of a viscous fluid.

As an example of a conventional rotary damper as described above, there is a rotary damper in an assembled state shown in section in FIG. 5.

In FIG. 5, reference numeral 1 shows a rotating member made of a synthetic resin, wherein a driven gear 2 is formed on a front side. On a back side, there are provided a circular fitting dent 3 corresponding at its center to a center of the driven gear 2, and inner and outer cylindrical projections 4, 5 formed concentrically with the circular fitting dent 3.

Reference numeral 11 shows a fixed member made of a synthetic resin. The fixed member is provided with a cylindrical supporting shaft 12 to be fitted into the circular fitting dent 3; a cylindrical partition wall 13 to be inserted between the cylindrical projections 4, 5, a center of which is a center of the supporting shaft 12; a cylindrical outer circumferential wall 15 concentrically formed with the cylindrical partition wall 13, the outer cylindrical portion 5 being inserted inside the cylindrical outer circumferential wall 15; and two attaching holes 16 located outside the cylindrical outer circumferential wall 15.

Incidentally, the height of the cylindrical partition wall 13 is made lower than that of the cylindrical outer circumferential wall 15. Reference numeral 21 shows a viscous fluid, such as silicone oil and grease, filled in spaces formed between the rotating member 1 and the fixed member 11.

FIGS. 6 and 7 are explanatory views for showing an assembly process of the rotary damper.

In FIG. 6, reference numeral I shows an injection pipe for injecting the viscous fluid 21.

Next, assembly of the rotary damper is explained.

First, as shown in FIG. 6, the rotating member 1 is set on, for example a jig, such that the cylindrical projections 4, 5 project upwardly, and after the rotating member 1 is fixed, a predetermined amount of the viscous fluid 21 is injected into a portion surrounded by the inner cylindrical projection 4 through the injection pipe I.

Then, as shown in FIG. 7, the supporting shaft 12 of the fixed member 11 is oriented downwardly, and is placed onto the rotating member 1 such that the supporting shaft 12 is fitted into the circular fitting dent 3; the cylindrical partition wall 13 is inserted between the cylindrical projections 4, 5; and also, the outer cylindrical projection 5 is inserted inside an inner circumference of the cylindrical outer circumferential wall 15.

By inserting and fitting various portions as described above, the viscous fluid 21 is sequentially pushed outwardly from an inner side through spaces formed by the rotating member 1 and the fixed member 11 to thereby fill the spaces.

Incidentally, the rotary damper as shown in FIGS. 5 and 6 is disclosed in, for example, Japanese Utility Model Publication (KOKOKU) 1-37236.

In the conventional rotary damper, after the viscous fluid 21 is injected into an inner side of the inner cylindrical projection 4, the supporting shaft 12 is fitted into the circular fitting dent 3. At this time, since a space between the circular fitting dent 3 and the supporting shaft 12 is small, the viscous fluid 21 in the circular fitting dent 3 is not pushed out smoothly, so that the assembly can not be carried out with good workability.

In order to obtain a good flow of the viscous fluid 12, if the space between the circular fitting dent 3 and the supporting shaft 12 is made larger, the assembly can be carried out with good workability. However, since wobbling between the circular fitting dent 3 and the supporting shaft 12 becomes large, there has been another problem that the driven gear 2 can not be meshed well with the rack or the like.

Also, the spaces formed by the rotating member 1 and the fixed member 11 are formed vertically along the surface of the inner cylindrical projection 4 and the surface of the outer cylindrical projection 5 to thereby meander, so that a flow path resistance becomes large. Therefore, there has been a disadvantage that the viscous fluid 21 in the circular fitting dent 3 is not fully supplied to outer spaces, so that a desired damper effect can not be obtained.

The present invention has been made to obviate the above disadvantages, and an object of the present invention is to provide a rotary damper, wherein assembly can be carried out with good workability.

Another object of the present invention is to provide a rotary damper as stated above, wherein a desired damper effect can be easily obtained.

A further object of the present invention is to provide a rotary damper as stated above, which is endurable for long-time use.

A still further object of the present invention is to provide a rotary damper as stated above, wherein a driven gear can be well meshed with a rack or the like.

Further objects and advantages of the invention will be apparent from the following description of the invention.

SUMMARY OF THE INVENTION

A rotary damper is formed of a first member and a second member engaging with each other. In particular, the first member includes a driven gear on one side, and one of a supporting shaft and an inner cylindrical projection to form a circular fitting dent therein on a side opposite to the one side. The second member includes the other of the supporting shaft and the inner cylindrical projection on one side thereof. The supporting shaft is inserted into the fitting dent of the inner cylindrical projection to connect the first and second members together.

In the invention, at least one of the supporting shaft and the inner cylindrical projection may have grooves on circumferential surfaces facing each other. A viscous fluid is filled in the grooves to closely arrange the cylindrical projection and the supporting shaft with sufficient viscous fluid therebetween.

Also, an inner cylindrical partition wall may be situated outside the supporting shaft, and an outer cylindrical projection may be situated outside the inner cylindrical projection. At least one of the inner cylindrical partition wall and the outer cylindrical projection may have discontinuous portions therein in an axial direction. Namely, the inner cylindrical partition wall or the outer cylindrical projection is formed discontinuously to receive the viscous fluid therein.

The first member may be a rotating member and include the inner and outer cylindrical projections, and the second member may be a fixed member and include the supporting shaft, the inner cylindrical partition wall and an outer cylindrical partition wall. The outer cylindrical projection is situated between the inner and outer cylindrical partition walls.

In the invention, the rotating member and the fixed member can be situated closely with a sufficient viscous fluid therein. Thus, the members can be easily assembled, and a desired damping effect can be obtained.

DETAILED DESCRIPTION OF THE PREFERRED EMBODIMENTS

Figure 1:
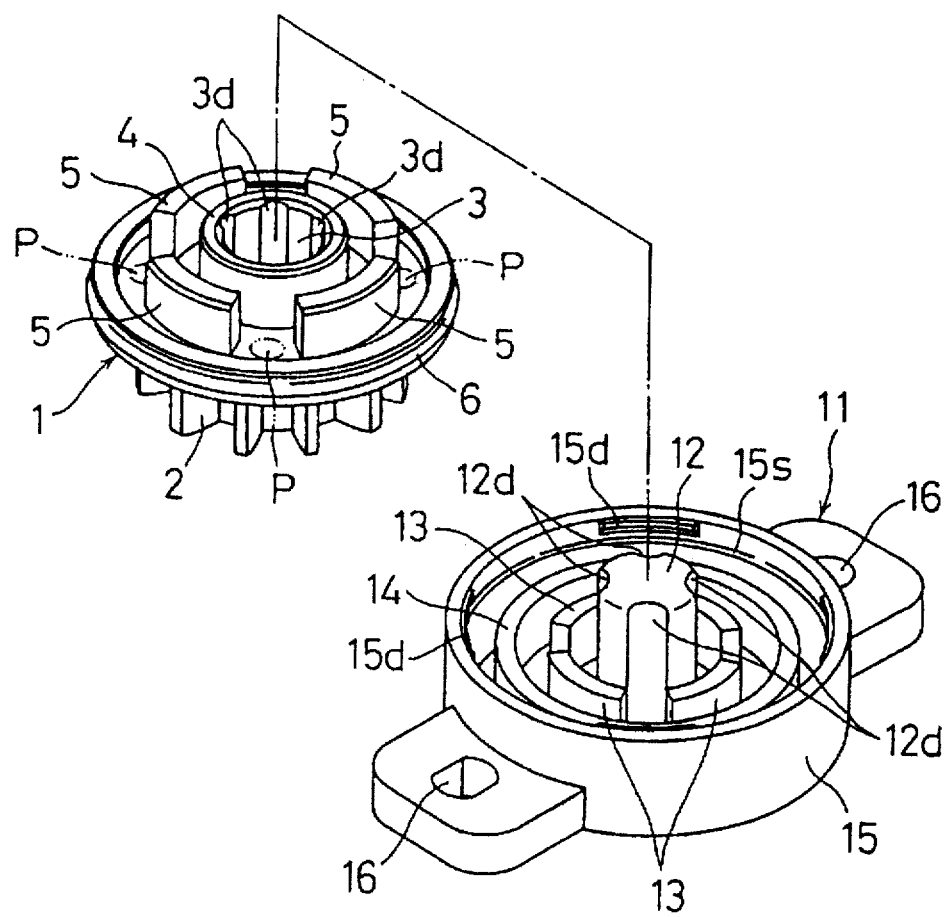
FIG. 1 is an exploded perspective view for showing a first embodiment of a rotary damper according to the present invention.

Hereunder, embodiments of the present invention are described referring to the drawings.

Figure 2:
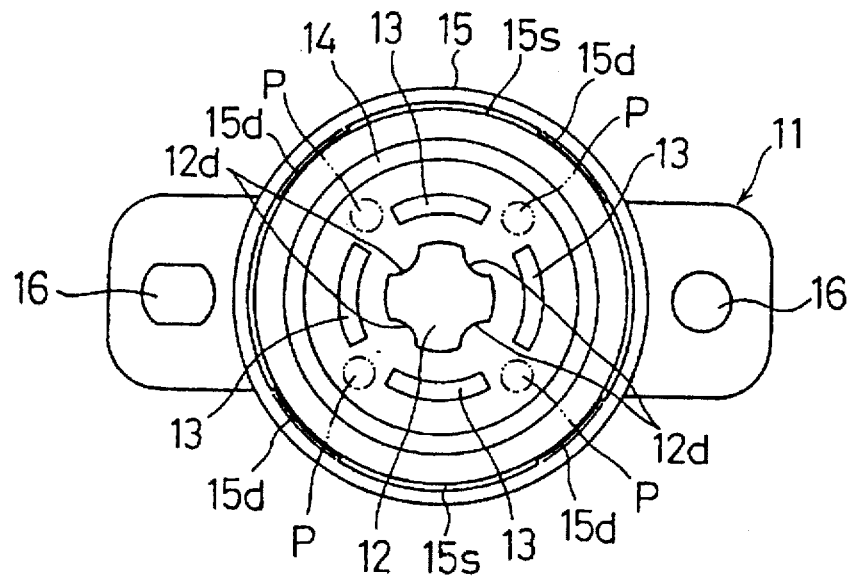
FIG. 2 is a plan view of a fixed member shown in FIG. 1.
Figure 5:
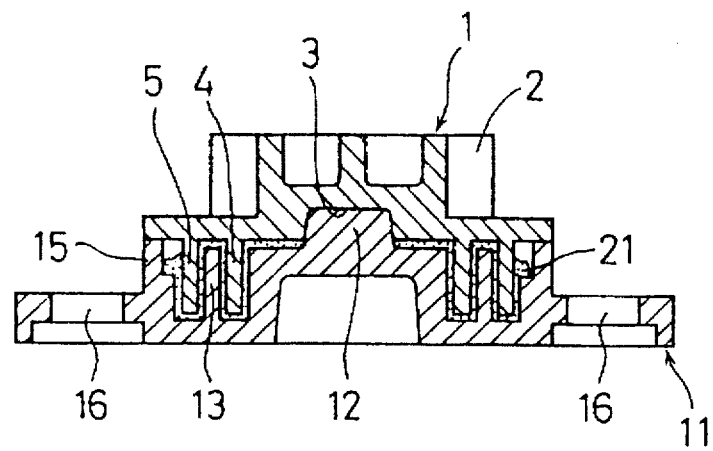
FIG. 5 is a sectional view in an assembled state of an example of a conventional rotary damper.

FIG. 1 is an exploded perspective view for showing a first embodiment of a rotary damper according to the present invention; FIG. 2 is a plan view of a fixed member shown in FIG. 1; and FIG. 3 is a sectional view in an assembled state of the rotary damper of the first embodiment shown in FIG. 1, wherein the same reference numerals are assigned to the same parts as or parts corresponding to, those in FIGS. 5–7, and explanations thereof are omitted.

Incidentally, the rotating member shown in FIG. 1 is positioned upside down.

Figure 3:
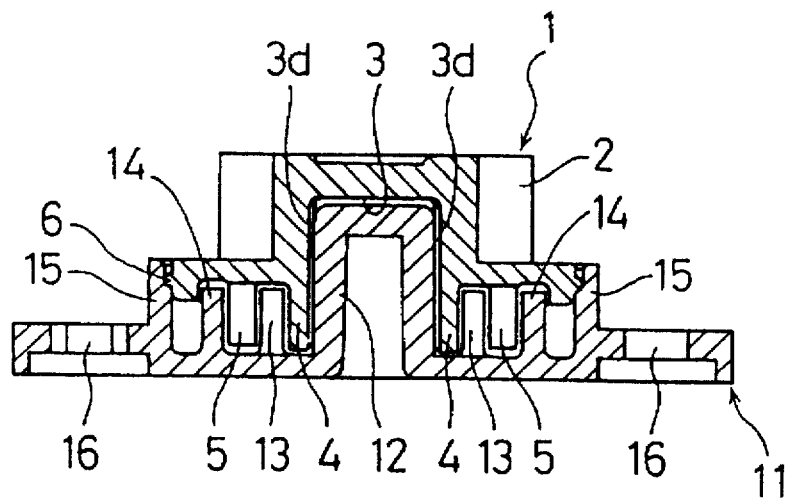
FIG. 3 is a sectional view in an assembled state of the rotary damper of the first embodiment shown in FIG. 1.

Also, a viscous fluid is omitted in FIG. 3 to simply show spaces between the rotating member and the fixed member in the assembled state.

In the drawings, reference numeral 3d shows grooves, and the grooves are formed to extend from one end to the other end in an axial direction on an inner circumferential surface of a circular fitting dent 3 so that the inner circumferential surface and a surface of groove 3d are alternately disposed, for example, in every 30° at a central angle.

Reference numeral 6 shows an annular projection, and the projection is disposed around an outer circumference of the rotating member 1, and is rotatably fitted to an annular step 15s, described later.

Incidentally, an inner cylindrical projection 4 is used as a side wall of the circular fitting dent 3. Also, an outer cylindrical projection 5 is discontinuously formed to have a space of, for example, 30° at a central angle in every 60° at the central angle for the projection.

Reference numeral 12d shows grooves, and the grooves are formed around an outer circumferential surface of a supporting shaft 12 to extend from one end to the other end in an axial direction of the supporting shaft 12 so that the outer circumferential surface and a surface of the groove 12d are alternately disposed, for example, in every 45° at the central angle.

Reference numeral 14 represents an outer cylindrical partition wall which is formed concentrically with a cylindrical partition wall (hereinafter referred to as an inner cylindrical partition wall) 13. The inner cylindrical partition wall 13 is discontinuously formed to have spaces of, for example, 30° at the central angle in every 60° at the central angle for the inner cylindrical partition wall 13.

Reference numeral 15s shows an annular step, which is formed around an upper portion of an inner circumference of a cylindrical outer circumferential wall 15. Reference numeral 15d shows engaging pieces. Four engaging pieces 15d are provided around an upper edge of the inner circumference of the cylindrical outer circumferential wall 15 to be equally spaced apart from each other so that the annular projection 6 is not drawn out of the annular step 15s. Reference numeral P shows hitting positions by pushing pins where the pushing pins are hit when a product is removed from a mold.

Next, removal of the products from molds at a time of molding of the rotating and fixed members is explained.

First, as shown in FIG. 1, although a width of an outer side of the outer cylindrical projection 5 is narrow, since the hitting positions P by the pushing pins can be formed by using the discontinuous portions of the outer cylindrical projection 5, when the rotating member 1 is removed from the mold, it is possible to hit the hitting positions P by the hitting pins. Thus, the rotating member 1 can be removed from the mold with good workability.

Also, as shown in FIG. 2, although a space between the inner cylindrical partition wall 13 and the outer cylindrical partition wall 14 is narrow, since the hitting positions P by the pushing pins can be formed by using the discontinuous portions of the inner cylindrical partition wall 13, when the fixed member 11 is removed from a mold, it is possible to hit the hitting positions P by the hitting pins. Thus, the fixed member 11 can be removed from the mold with good workability.

Next, assembly is explained.

Figure 6:
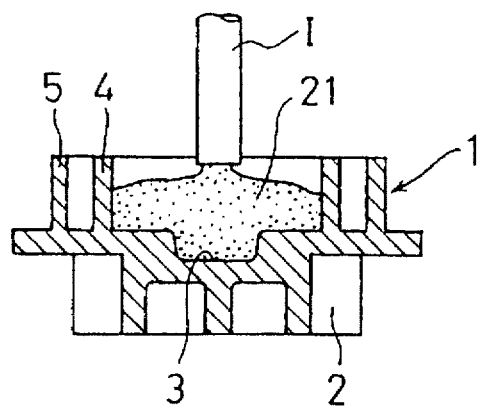
FIGS. 6 and 7 are explanatory views for showing an assembling process of the conventional rotary damper.

First, as shown in FIG. 6, the rotating member 1 is positioned such that the cylindrical projections 4, 5 project upwardly and is fixed on, for example, a jig. Then, a predetermined amount of a viscous fluid 21 is injected into a portion surrounded by the inner cylindrical projection 4 through an injection pipe I.

Figure 7:
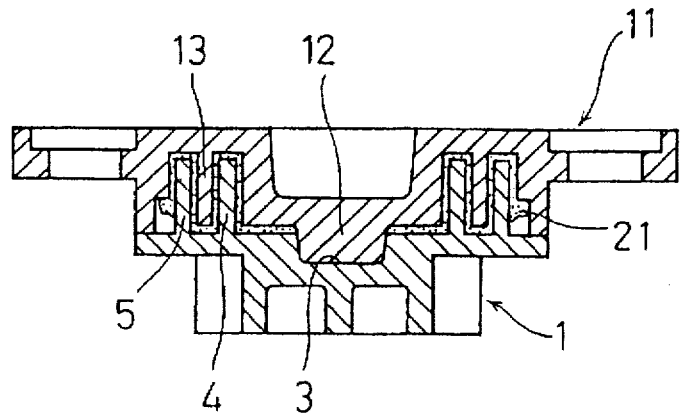

Then, as shown in FIG. 7, the supporting shaft 12 and the like of the fixed member 11 are oriented downwardly, and the supporting shaft 12 is fitted into the circular fitting dent 3. Thus, the inner cylindrical projection 4 is inserted between the supporting shaft 12 and the inner cylindrical partition wall 13, and the inner cylindrical partition wall 13 is inserted between the cylindrical projections 4, 5. At the same time, the outer cylindrical projection 5 is inserted between the cylindrical partition walls 13, 14, and the annular projection 6 is pressed in the annular step 15s to engage the engaging pieces 15d. Thus, as shown in FIG. 3, assembly can be completed.

By fitting and inserting various portions as described above, the viscous fluid 21 is sequentially pushed out from the inner side to the outer side to thereby fill the spaces formed by the rotating member 1 and the fixed member 11. Since the grooves 3d are provided at the inner circumferential surface of the circular fitting dent 3 and the grooves 12d are provided at the outer circumferential surface of the supporting shaft 12, when the supporting shaft 12 is inserted into the circular fitting dent 3, even if a space between the circular fitting dent 3 and the supporting shaft 12 is small, the viscous fluid 21 in the circular fitting dent 3 can be easily pushed out through the grooves 3d and 12d. Thus, assembly can be carried out with good workability.

Also, since the space between the circular fitting dent 3 and the supporting shaft 12 can be made small, looseness or wobbling between the circular fitting dent 13 and the supporting shaft 12 can be eliminated, and a driven gear 2 can be well meshed with a rack or the like.

Further, since the outer cylindrical projection 5 and the inner cylindrical partition wall 13 are discontinuously formed, the viscous fluid 21 can be fully filled into outer spaces through the discontinuous portions of the outer cylindrical projection 5 and/or the inner cylindrical partition wall 13. Accordingly, a desired damper effect can be easily obtained.

The grooves 3d are formed on the circular fitting dent 3, the grooves 12d are provided in the supporting shaft 12, and the outer cylindrical projection 5 and the inner cylindrical partition wall 13 are discontinuously formed. Thus, a plenty of the viscous fluid 21 can be stored in the grooves 3d, 12d and the discontinuous portions of the outer cylindrical projection 5 and the inner cylindrical partition wall 13. Also, through the grooves 3d, 12d and the discontinuous portions of the outer cylindrical projection 5 and the inner cylindrical partition wall 13, the viscous fluid 21 can be supplied to the respective spaces. Thus, the viscous fluid 21 can be uniformly and fully supplied to the respective spaces, and the product endurable for long-time use can be obtained.

Figure 4:
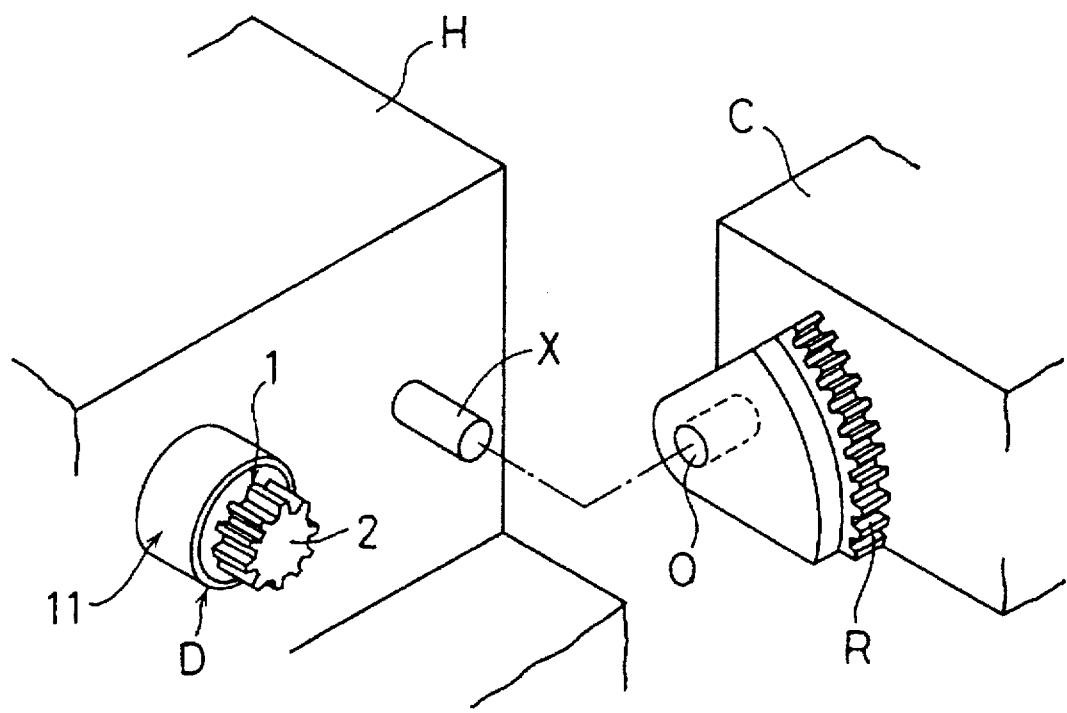
FIG. 4 is a partially exploded perspective view for showing a second embodiment of a rotary damper according to the present invention.

FIG. 4 is a partially exploded perspective view for showing an application example of a second embodiment of a rotary damper according to the present invention. Incidentally, a lid C has been rotated by 90° to a right side.

In FIG. 4, H shows a housing, and a rotary damper D and a supporting shaft X are attached to a side surface thereof.

The lid C includes on a side surface thereof a fitting hole O into which the supporting shaft X is rotatably fitted, and a rack R aligned relative to the supporting shaft X as a center thereof and engaging the driven gear 2 of the rotary damper D. The lid C is urged in an opening direction by an urging force of an urging member, such as a torsion spring, not shown.

In this embodiment, the rotary damper D does not have the fitting holes 16 as shown in the first embodiment. As shown in FIG. 4, the supporting shaft X is fitted into the fitting hole O, and the driven gear 2 and the rack R are engaged. When the lid C rotatably provided with respect to the housing H is rotated in an opening or closing direction, opening and closing operations of the lid C can be braked at a desired torque. Thus, damper effect can be provided to the opening and closing operations of the lid C.

Incidentally, in the first embodiment described above, although the grooves 3d are formed on the circular fitting dent 3 and grooves 12d are provided to the supporting shaft 12, in case either the grooves 3d or the grooves 12d are provided, the same effect can also be obtained.

Also, although the circular fitting dent 3 is provided in the rotating member 1 and the supporting shaft 12 is provided in the fixed member 11, the supporting shaft may be provided in the rotating member and the circular fitting dent may be provided in the fixed member.

Further, although the outer cylindrical projection 5 and the inner cylindrical partition wall 13 are discontinuously formed, either the outer cylindrical projection 5 or the inner cylindrical partition wall 13 may be discontinuously formed. In case the inner cylindrical projection 4 is not used as the side wall of the circular fitting dent 3, the same effect can be obtained by forming the inner cylindrical projection 4 discontinuously.

In the second embodiment, although the rotary damper D and the supporting shaft X are integrally fixed to the housing H, the rotary damper D and the supporting shaft X may be provided on a base, and the base may be attached to the housing.

Also, in the second embodiment, although the rack R is projected from a side surface of the lid C, the lid C may have a circular arc-shape groove with a rack, into which the rotary damper D is located. Thus, the rack can be held in an inner side instead of the side surface of the lid.

As described hereinabove, according to the present invention, since the grooves are formed on at least one of the inner circumferential surface of the circular fitting dent and the outer circumferential surface of the supporting shaft, when the supporting shaft is fitted into the circular fitting dent, even if the space between the circular fitting dent and the supporting shaft is small, the viscous fluid in the circular fitting dent can be easily pushed out through the grooves. Thus, assembly can be carried out with good workability.

Also, since the space between the circular fitting dent and the supporting shaft can be made small, looseness or wobbling between the circular fitting dent and the supporting shaft can be eliminated. Thus, a driven gear can be well meshed with a rack or the like.

Further, since a plenty of the viscous fluid can be stored in the grooves and supplied to the respective spaces from the grooves, the viscous fluid can be fully and uniformly supplied to the respective spaces, and also a product endurable for long-time use can be obtained.

Still further, since at least one of the cylindrical projection and the cylindrical partition wall is discontinuously formed, the hitting positions of the pushing pins can be established by using the discontinuous portions of the cylindrical projection and the cylindrical partition wall. Thus, when the rotating member and the fixed member are removed from molds, by hitting the hitting positions by the pushing pins, the rotating member and the fixed member can be removed from the molds with good workability.

Also, since at least one of the cylindrical projection and the cylindrical partition wall is discontinuously formed, the viscous fluid is fully filled up to the spaces on an outer side through the discontinuous portions of the cylindrical projection and the cylindrical partition wall, so that a desired damper effect can be easily obtained.

Further, since at least one of the cylindrical projection and the cylindrical partition wall is discontinuously formed, a plenty of the viscous fluid can be stored in the discontinuous portions of the cylindrical projection and the cylindrical partition wall, and the viscous fluid can be supplied to the spaces from the discontinuous portions. Thus, the sufficient viscous fluid can be uniformly supplied to the respective spaces, and also products endurable for long-time use can be obtained.

While the invention has been explained with reference to the specific embodiments of the invention, the explanation is illustrative, and the invention is limited only by the appended claims.

What is claimed is:

1. A rotary damper comprising:
 a first member including a driven gear on one side, and one of a supporting shaft and an inner cylindrical projection to form a circular fitting dent therein on a side opposite to said one side, and
 a second member including the other of said supporting shaft and said inner cylindrical projection on one side thereof, said supporting shaft being inserted into the fitting dent of the inner cylindrical projection to connect the first and second members together, at least one of said supporting shaft and said inner cylindrical projection having grooves in an axial direction on circumferential surfaces facing each other to receive a viscous fluid therein to closely arrange the inner cylindrical projection and the supporting shaft with the viscous fluid therebetween.

2. A rotary damper as claimed in claim 1, wherein said grooves are formed on the supporting shaft and the inner cylindrical projection and are different in sizes so that the supporting shaft is coaxially positioned in the fitting dent.

3. A rotary damper as claimed in claim 2, wherein said first member is a rotating member and includes the inner cylindrical projection and an outer cylindrical projection situated outside the inner cylindrical projection, and the second member is a fixed member and includes the supporting shaft and inner and outer cylindrical partition walls, said outer cylindrical projection being situated between the inner and outer cylindrical partition walls.

4. A rotary damper as claimed in claim 3, wherein said outer cylindrical projection and the inner partition wall are formed discontinuously to have discontinuous portions, the viscous fluid being filled in the discontinuous portions of the outer cylindrical projection and the inner partition wall.

5. A rotary damper as claimed in claim 4, wherein said rotating member has an annular projection extending from an outer circumference thereof, and said fixed member has an annular step disposed around an inner circumference of a cylindrical outer circumferential wall to engage said annular projection.

6. A rotary damper comprising:

a first member including a driven gear on one side, and one of a supporting shaft and an inner cylindrical projection to form a circular fitting dent therein on a side opposite to said one side, a second member including the other of said supporting shaft and said inner cylindrical projection on one side of the second member, said supporting shaft being inserted into the fitting dent of the inner cylindrical projection to connect the first and second members together, and an inner cylindrical partition wall situated outside the supporting shaft and an outer cylindrical projection situated outside the inner cylindrical projection, at least one of the inner cylindrical partition wall and the outer cylindrical projection having discontinuous portions therein in an axial direction to receive viscous fluid therein.

7. A rotary damper as claimed in claim 6, wherein said first member is a rotating member and includes the inner and outer cylindrical projections, and the second member is a fixed member and includes the supporting shaft, the inner cylindrical partition wall and an outer cylindrical partition wall, said outer cylindrical projection being situated between the inner and outer cylindrical partition walls.

8. A rotary damper as claimed in claim 7, wherein said rotating member has an annular projection extending from an outer circumference thereof, and said fixed member has an annular step disposed around an inner circumference of a cylindrical outer circumferential wall to engage said annular projection.

* * * * *